United States Patent
Hasegawa et al.

(10) Patent No.: US 8,174,793 B2
(45) Date of Patent: May 8, 2012

(54) THIN FILM MAGNETIC HEAD AND MAGNETIC DISK DEVICE AND ELECTRONIC COMPONENT

(75) Inventors: Yasuhiro Hasegawa, Tokyo (JP); Hiroshi Fumoto, Tokyo (JP); Yoshiaki Tanaka, Tokyo (JP); Katsuya Kanakubo, Tokyo (JP); Shingo Miyata, Tokyo (JP); Soji Koide, Tokyo (JP); Noriyuki Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 72 days.

(21) Appl. No.: 12/820,183

(22) Filed: Jun. 22, 2010

(65) Prior Publication Data

US 2011/0310512 A1 Dec. 22, 2011

(51) Int. Cl.
*G11B 5/60* (2006.01)

(52) U.S. Cl. .................................. 360/234.5

(58) Field of Classification Search ............... 360/234.5
See application file for complete search history.

(56) References Cited

U.S. PATENT DOCUMENTS

| 4,219,853 | A  | * | 8/1980  | Albert et al. ............... 360/234.5 |
| 5,623,214 | A  |   | 4/1997  | Pasiecznik, Jr. |
| 7,450,342 | B2 | * | 11/2008 | White et al. ............... 360/234.5 |
| 7,535,676 | B2 | * | 5/2009  | Lille ........................ 360/234.5 |
| 7,619,856 | B2 | * | 11/2009 | Matsumoto et al. ....... 360/234.5 |
| 7,782,568 | B2 | * | 8/2010  | Shiraki et al. ............. 360/234.5 |
| 7,924,532 | B2 | * | 4/2011  | Jeong et al. ............... 360/245.8 |
| 7,987,582 | B2 | * | 8/2011  | Yamaguchi ............... 29/603.06 |
| 2006/0044689 | A1 | * | 3/2006 | Lille ......................... 360/234.5 |

FOREIGN PATENT DOCUMENTS

| JP | 08-211101 A     | 8/1996  |
| JP | 2003-338529 A   | 11/2003 |
| JP | 2006-525516 A   | 11/2006 |

* cited by examiner

*Primary Examiner* — Mark Blouin
(74) *Attorney, Agent, or Firm* — Posz Law Group, PLC

(57) ABSTRACT

A thin film magnetic head has a plurality of electrode terminals formed on substantially the same surface as the head formation surface on which magnetic head element is laminated. The plurality of electrode terminals is arranged in an array near and along the second side of the head formation surface that is opposite the first side on the ABS side, from which the functional end of the magnetic head is exposed. The plurality of electrode terminals is formed to include a pad and a protrusion formed along a part of the periphery of the pad.

15 Claims, 10 Drawing Sheets

FIG.10
PRIOR ART
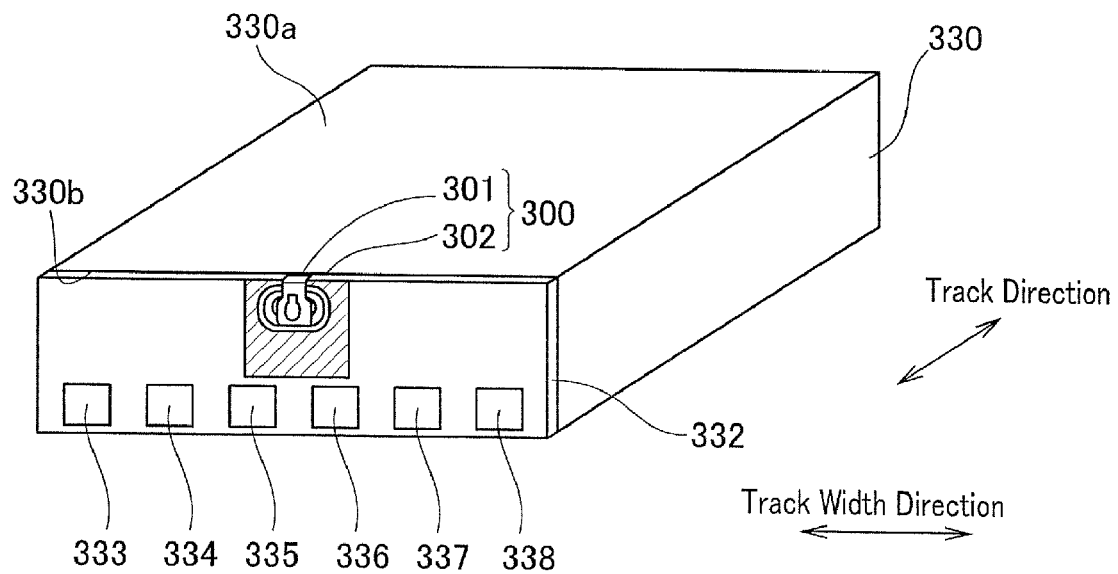
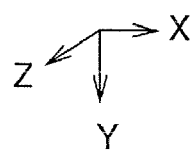

THIN FILM MAGNETIC HEAD AND MAGNETIC DISK DEVICE AND ELECTRONIC COMPONENT

BACKGROUND OF THE INVENTION

1. Field of the Invention

The present invention relates to a thin film magnetic head that has a plurality of electrode terminals formed on the same surface as a head element formation surface of a slider substrate, on which a magnet head element is laminated.

In particular, the present invention relates to a thin film magnetic head that has electrode terminals and an electronic component that can prevent a probe pin from sliding off of and being disengaged from the electrode terminals at the time of probing, and that can prevent a short circuit between adjacent electrode terminals caused by a bonding metal that has flowed outside the electrode terminals at the time of bonding, even if an area of an electrode terminal becomes small or even if a gap between adjacent electrode terminals narrows due to an increased number of electrode terminals to be provided.

2. Description of Conventional Technology

For the production of thin film magnetic heads, various laminate patterns are sequentially formed on a wafer substrate after multiple integration processes.

As a result, normally tens of thousands of elements for a thin film magnetic head structure are formed in a matrix on a single wafer substrate.

In the process for producing such thin film magnetic heads, the wafer substrate is cut into a plurality of bar-shaped blocks during the production process after the integration process. Thereafter, the bar-shaped wafer substrate is cut into individual sliders (i.e., the smallest unit of thin film magnetic heads), which thereafter go through final processing.

As shown in FIG. 10, for example, each slider (i.e., thin film head) includes a slider substrate 330 that has an ABS (air bearing surface) 330a processed so as to obtain an appropriate flying height, a magnetic head element 300 provided on an element formation surface 330b that is a side surface perpendicular to the ABS 330a, a protector 332 provided on the element formation surface 330b to cover the magnetic head element 300, six electrode terminals 333, 334, 335, 336, 337 and 338, for example, that are exposed from a surface of the protector 332 (there is also a case of four electrode terminals).

The magnetic head element 300 includes, as main components, a magnetoresistive effect (MR) reading head element 301 for reading out data signals from a magnetic disk, and an inductive writing head element 302 for writing data signals onto the magnetic disk.

Of the plurality of electrode terminals, the electrode terminals 333 and 334, for example, are respectively electrically connected to the MR reading head element 301, and the electrode terminals 335 and 336, for example, are respectively electrically connected to the inductive writing head element 302. The electrode terminals 337 and 338, for example, are connected to a heater embedded in the slider for fine-tuning the flying height of the thin film magnetic head. As discussed above, the electrode terminals 337 and 338 may not exist.

For assuring the quality of the thin film magnetic heads, various measurements, such as inductance characteristic of the reading head element 301, a coil resistivity value, MR characteristic of the writing head element 302, a heater resistivity value and an insulation resistivity, become necessary with the above-discussed electrode terminals. At that time, tests for measuring desired characteristic of each element and the like are performed by attaching a measurement pin (probe pin) for the measurement onto the electrode terminal.

The conventional art shown in FIG. 10 includes six electrode terminals. Because there is a relatively sufficient space on the element formation surface 330b on which the electrode terminals are provided, an area for each electrode terminal can be made large, and the gap between adjacent electrode terminals can be increased.

As a result, the measurement pin rarely slides off, and is rarely disengaged from, the electrode terminals at the time of probing. Further, there is a small possibility that the bonding metal flows outside an electrode terminal and causes a short circuit between adjacent electrode terminals at the time of bonding the electrode terminals.

However, presently the head sizes are becoming smaller to make the head more compact. Moreover, with a new structure of a final product, the number of electrode terminals is tending to increase to provide multiple functions in the head. For example, the possibility that around ten electrode terminals are to be provided is now extremely high. Product development has actually proceeded based on such a direction.

According to such a tendency, the size of each electrode terminal (i.e., pad) must be reduced. However, with a reduced size of the electrode terminals, measurement errors due to disengagement of the measurement pin from the pad at the time of probing tends to increase. In addition, because the gap between adjacent electrode terminals is narrowed, the chance of a short circuit between adjacent electrode terminals at the time of bonding the electrode terminals tends to increase.

The present invention was conceived based on such facts. An object of the present invention is to provide a thin film magnetic head with electrode terminals that can reduce measurement errors by preventing the measurement pin (probe pin) from sliding off and disengaging from the electrode terminals at the time of probing, and that can prevent a bonding metal from flowing outside the electrode terminal at the time of bonding to prevent the occurrence of a short circuit between adjacent electrode terminals, even if the area of the electrode terminals is reduced or even if the gap between the adjacent electrode terminals is reduced due to the increase in the number of electrode terminals to be provided and the like.

SUMMARY OF THE INVENTION

To solve the above-discussed problems, a thin film magnetic head of this invention configured to include a slider substrate having an air bearing surface (ABS) that configured to provide an appropriate flying height from a recording medium; a magnetic head element formed on a head formation surface that is a side surface relative to the ABS when the ABS is considered as a bottom surface, that is in an approximately rectangular shape that is perpendicular to a track direction; and a plurality of electrode terminals formed on a substantially same surface as the head formation surface on which the magnetic head element is laminated, wherein the plurality of electrode terminals is arranged in an array on a second side of the head formation surface that is opposite a first side on the ABS side from which a functional end of the magnetic head is exposed, and the plurality of electrode terminals includes a pad and a protrusion formed along a part of a periphery of the pad.

As a preferable configuration of the thin film magnetic head of this invention, the plurality of electrode terminals includes a rectangular pad and a protrusion formed along at least one side of the rectangular pad.

As a preferable configuration of the thin film magnetic head of this invention, each of the plurality of electrode terminals includes a rectangular pad and a protrusion formed along one side of the rectangular pad that extends in a direction perpendicular to a track width direction.

As a preferable configuration of the thin film magnetic head of this invention, each of the plurality of electrode terminals includes a rectangular pad and protrusions formed along two sides of the rectangular pad that extend in a direction perpendicular to a track width direction.

As a preferable configuration of the thin film magnetic head of this invention, each of the plurality of electrode terminals is either of a type of electrode terminal including a rectangular pad and a protrusion formed along one side of the rectangular pad that extends in a direction perpendicular to a track width direction or of another type of electrode terminal including a rectangular pad and protrusions formed along two sides of the rectangular pad that extend in the direction perpendicular to the track width direction.

As a preferable configuration of the thin film magnetic head of this invention, the pad is formed from one of Au, Ag, Cu, Ti and Al, and the protrusion is formed from one of conductive materials having a lower solder adherence property than the material selected for the pad, and alumina.

As a preferable configuration of the thin film magnetic head of this invention, the protrusion is formed on the pad.

As a preferable configuration of the thin film magnetic head of this invention, a height of the protrusion is 50-200 nm.

As a preferable configuration of the thin film magnetic head of this invention, a gap distance between adjacent ones of the plurality of electrode terminals arranged in the array is 5 μm or greater and 25 μm or less.

As a preferable configuration of the thin film magnetic head of this invention, the number of the plurality of electrode terminals arranged in the array is in a range of 7-12.

A head gimbal assembly of the present invention is configured to have a slider including the thin film magnetic head described above and positioned so as to oppose a recording medium; and a suspension that flexibly supports the slider.

A magnetic disk device of the present invention is configured to have a slider including the thin film magnetic head described above and positioned so as to oppose a recording medium; and a positioning device that supports and positions the slider with respect to the recording medium.

BRIEF DESCRIPTION OF THE DRAWINGS

FIG. 10 is a perspective view for schematically showing an entire body of a thin film magnetic head according to the conventional art.

DESCRIPTION OF PREFERRED EMBODIMENTS

Figure 1:
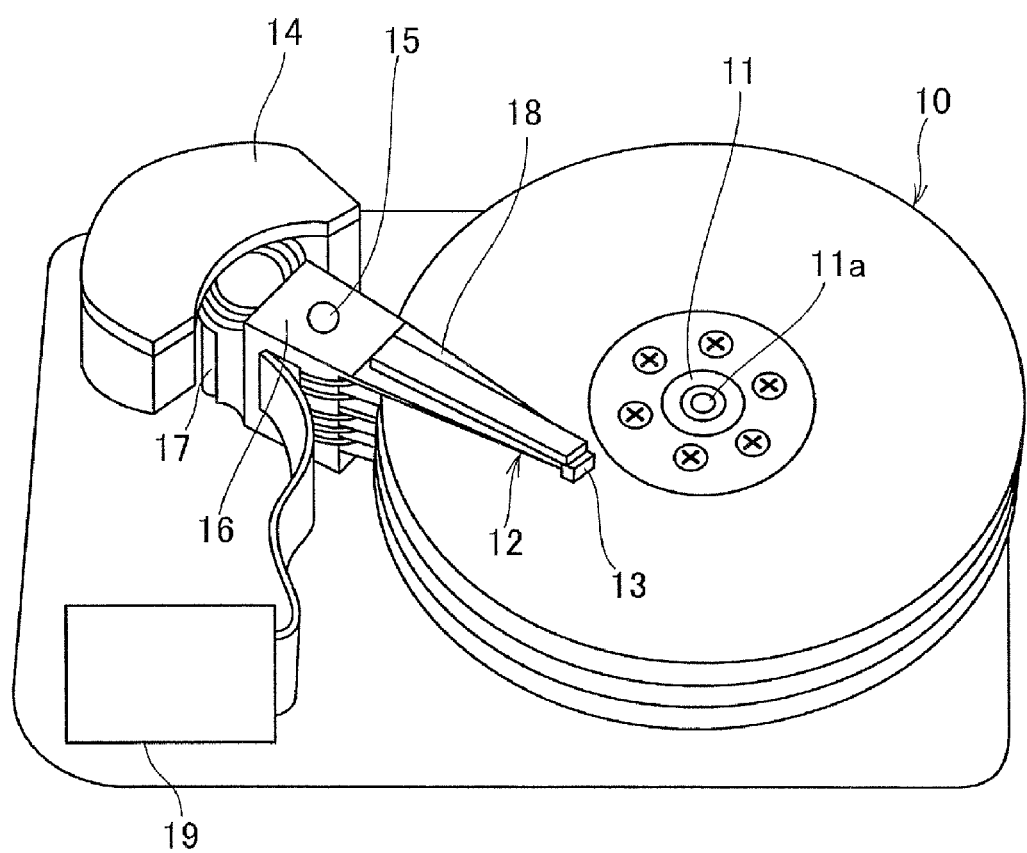
FIG. 1 is a perspective view for schematically showing a configuration of main parts of an embodiment of a magnetic disk device (e.g., hard disk drive, HDD) (synonym for a magnetic recording and reproduction device) according to the present invention.

The best mode for implementing the present invention is explained in detail below with reference to the attached drawings. In the drawings, the same forming components are indicated by the same reference number.

In addition, dimensions of and between the forming components are not necessarily illustrated accurately in the drawings for ease of viewing the drawings and therefore may be arbitrary.

Figure 3:
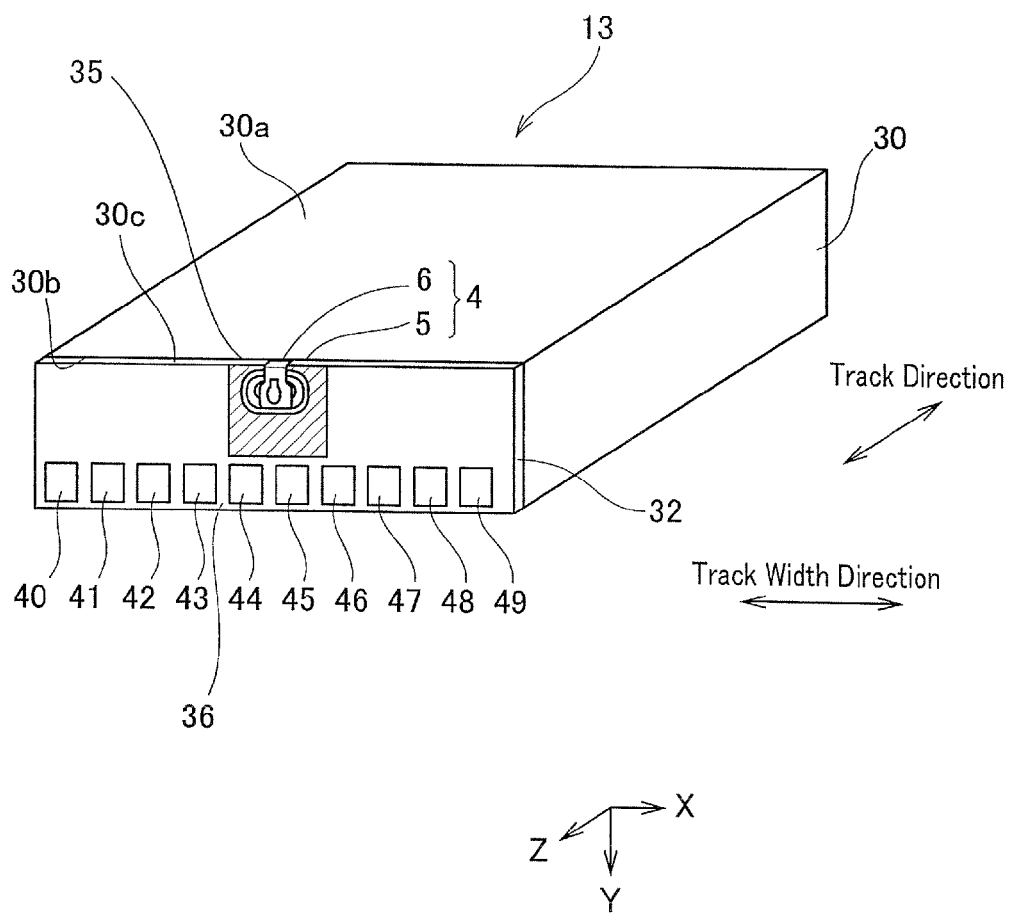
FIG. 3 is a perspective view for schematically showing an entire body of a thin film magnetic head according to embodiments of the present invention.

Further, the X-axis direction shown in FIG. 3 and the drawings thereafter corresponds to a track width direction. A length in the X-axis direction may be referred to as a "width."

The Y-axis direction shown in FIG. 3 and the drawings thereafter corresponds to a depth direction of an element. Of the Y-direction, a side closer to an air bearing surface (a surface of a thin film magnetic head facing a recording medium) may be referred to as a "front side," and the opposite side (deep side) may be referred to as a "rear side."

The Z-axis direction shown in FIG. 3 and the drawings thereafter corresponds to a track direction and a direction in which lamination films are laminated when forming an element, i.e., a thickness direction. The direction in which the lamination films are laminated may be referred to as an "upward direction" or an "upper side." The opposite direction may be referred to as a "downward direction" or a "down side."

Figure 2:
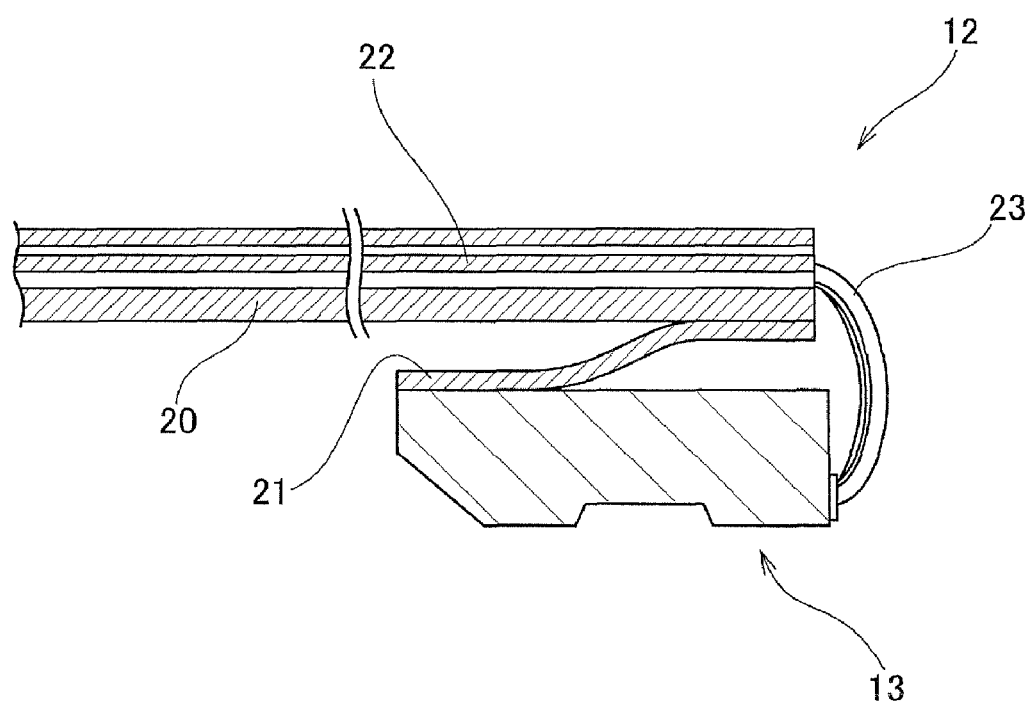
FIG. 2 is a schematic cross-sectional view of a part of a head gimbal assembly (HGA) in the magnetic disk device shown in FIG. 1.

FIG. 1 is a perspective view for schematically showing a configuration of main parts of an embodiment of a magnetic disk device (e.g., HDD) (synonym for a magnetic recording and reproduction device) according to the present invention. FIG. 2 is a schematic cross-sectional view of a part of a head gimbal assembly (HGA) in the magnetic disk device shown in FIG. 1.

A magnetic disk device is shown in FIG. 1. In the figure, reference number 10 indicates a plurality of magnetic disks that are rotated about a rotation shaft 11a by a spindle motor 11. Reference number 12 indicates a head gimbal assembly (HGA) for appropriately facing a thin film magnetic head (slider) 13 that writes and reads out data signals in and from the magnetic disk 10 onto a surface of each magnetic disk 10. Reference number 14 indicates an assembly carriage device for positioning the magnetic head (slider) 13 on the tracks of the magnetic disk 10.

The assembly carriage device 14 is formed primarily from a carriage 16 that is angularly swingable about a pivot bearing shaft 15 and a voice coil motor (VCM) 17, for example, that angularly swings the carriage 16.

On the carriage 16, bases for a plurality of drive arms 18 that are stacked in a direction of the pivot bearing shaft 15 are mounted. The HGA 12 is fixedly attached to a front end of each drive arm 18. A single magnetic disk 10, a single drive arm 18, and a single HGA 12 may be provided at the magnetic disk device.

The magnetic disks 10 are grounded via the spindle motor 11 and the rotation shaft 11a.

In FIG. 1, reference number 19 indicates a control circuit that controls writing and reading operations of the thin film magnetic head 13, for example. When multiple functions are provided to the thin film magnetic head 13 in addition to writing and reading operations, controls for such added functions are also added to the control circuit.

As shown in FIG. 2, the HGA 12 includes a thin film magnetic head 13 (slider), a load beam 20 and a flexure 21 both made of a metal conductive material for supporting the thin film magnetic head 13.

Moreover, at the HGA 12, a wiring member is provided for passing writing signals to be applied to the writing head element of the thin film magnetic head 13 and for outputting a reading output voltage by applying a constant current to the reading head element. The wiring member includes a wiring member for various kinds of multiple functions in addition to the writing and reading operations.

The multiple functions may include, for example, a heater function for heating each of the writing and reading head element sides for fine-tuning the flying height (distance) between the thin film magnetic head and the disk, a touch sensor function for detecting the touchdown of the thin film magnetic head onto the disk and the flying height, and GND for measures against electrostatic discharge (ESD).

The thin film magnetic head 13 is attached to an end of the flexure 21 that has flexibility. This flexure 21, and the load beam 20 attached to the other end thereof, form a suspension for supporting the thin film magnetic head 13.

As the wiring member 22, a lead conductor is formed in parallel with a surface of the load beam 20. The magnetic head-side tip of the wiring member 22 is connected to the electrode terminal by wire bonding using a wire 23. The wire member and the electrode terminal may be connected by ball bonding without using wire bonding.

FIG. 3 is a perspective view for schematically showing an entire body of the thin film magnetic head according to the present embodiment.

As shown in FIG. 3, the thin film magnetic head 13 includes a slider substrate 30 having an air bearing surface (ABS) 30a produced so as to provide an appropriate flying height, a magnetic head element 4 positioned on a side surface, or more specifically, an approximately rectangular head formation surface 30b of the slider substrate 30 that is perpendicular to the ABS 30a with respect to the track direction when the ABS 30a is relatively considered as a bottom surface, a protector 32 provided on the head formation surface 30b to cover the magnetic head element 4, and ten electrode terminals 40, 41, 42, 43, 44, 45, 46, 47, 48 and 49 exposed on a surface of the protector 32.

The magnetic head element 4 is formed by including, as main components, a magnetoresistive effect (MR) reading head element 6 for reading out data signals from the magnetic disk, and an inductive writing head element 5 for writing data signals in the magnetic disk.

For instance, the electrode terminals 42 and 43 are electrically connected to the MR reading element 6, and the electrode terminals 46 and 47 are electrically connected to the inductive writing head element 5.

An end of each of the MR reading head element 6 and the inductive writing head element 5 reaches a slider end surface 30c on the surface of the thin film magnetic head 13 on the side of the ABS 30a. The slider end surface 30c is a part of a medium opposing surface of the thin film magnetic head 13 that excludes the ABS 30a and a surface formed mainly by an end surface of the protector 32.

As the ends of the MR reading head element 6 and the inductive writing head element 5 oppose the magnetic disk, data signals are read out from the magnetic disk by detecting a signal magnetic field and are written in the magnetic disk by applying a signal magnetic field. In a vicinity of the end of each element that reaches the slider end surface 30c, a coating by an extremely thin diamond-like carbon (DLC) or the like may be applied for the purpose of protection.

(Explanation of Main Part of the Invention)

In the thin film magnetic head of the present invention, a plurality of electrode terminals 40, 41, 42, 43, 44, 45, 46, 47, 48 and 49 (ten in the figure) are formed on substantially the same surface as the head formation surface 30b as discussed above.

The phrase "substantially the same surface as the head formation surface 30b" means a surface that is the same surface as the head formation surface 30b, which is one of the four surfaces forming the side surfaces of the slider relative to the remaining three side surfaces generally as shown.

As shown in FIG. 3, the above-discussed plurality of electrode terminals 40, 41, 42, 43, 44, 45, 46, 47, 48 and 49 are arranged in an array near and along a second side 36 of the head formation surface 30b, which is opposite a first side 35 on the side of the ABS 30a, from which the functional end of the magnetic head is exposed. The reason why these electrode terminals are arranged in an array along the second side 36 is that the electrode terminals can be arranged only in this space.

Concerning this array arrangement, when the shape of the plurality of electrode terminals is rectangular, a side of the rectangular shape is positioned so as to be approximately parallel with the second side 36 of the head formation surface 30b.

In FIG. 3, details of the electrode terminals 40, 41, 42, 43, 44, 45, 46, 47, 48 and 49 are not illustrated due to a limited space of the paper surface. The details are illustrated, and can be referred to, in FIGS. 4 and 5 (first embodiment) and FIGS. 6 and 7 (second embodiment), which show an enlarged view of the vicinity of the electrode terminals.

Details of the main formation of the electrode terminals of the present invention are discussed below with reference to FIGS. 4 and 5 (first embodiment) and FIGS. 6 and 7 (second embodiment). First, the first embodiment is described.

Figure 4:
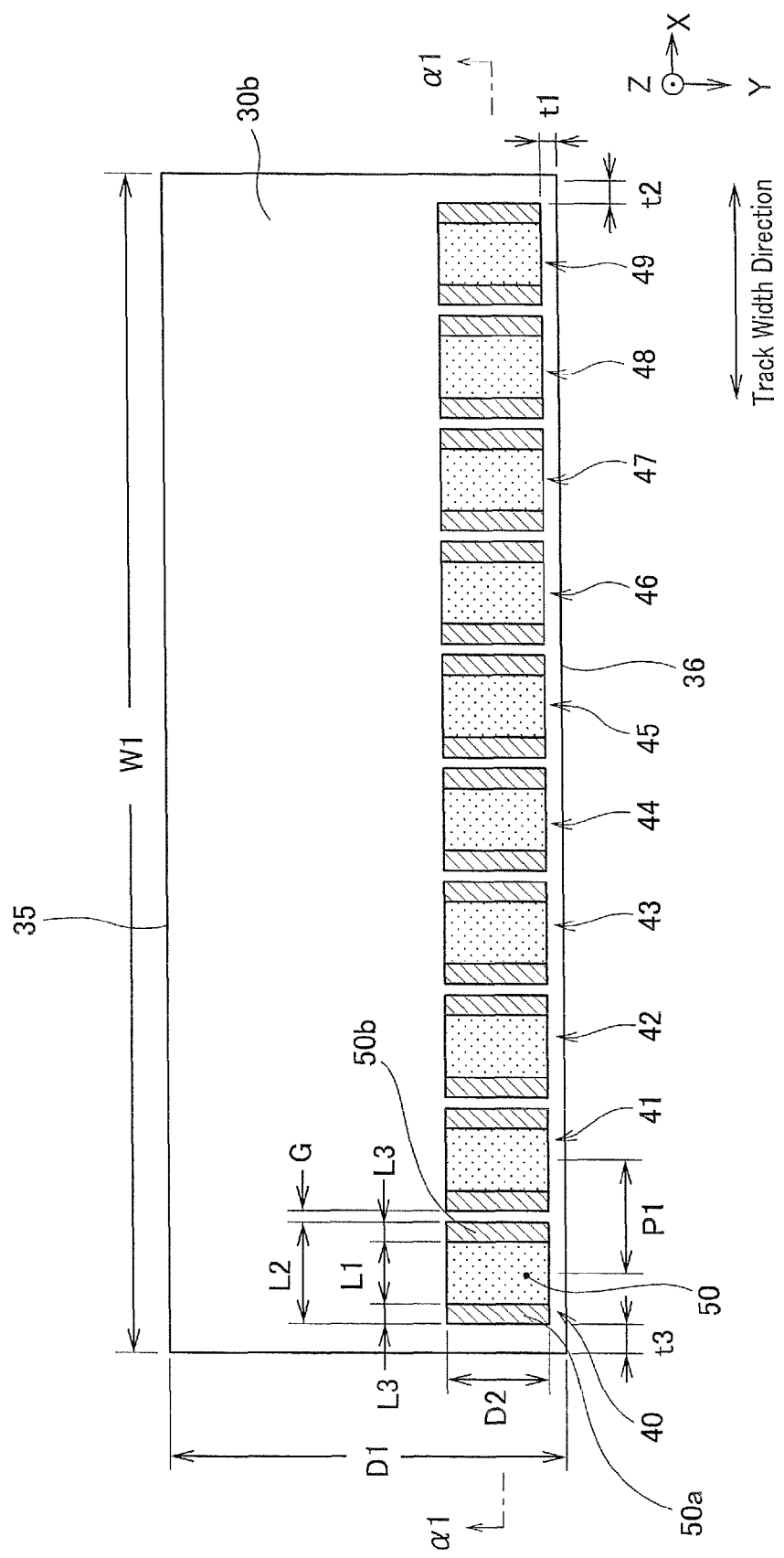
FIG. 4 is a plan view for schematically showing a formation and an array of electrode terminals according to a first embodiment, particularly in the thin film magnetic head.
Figure 5:
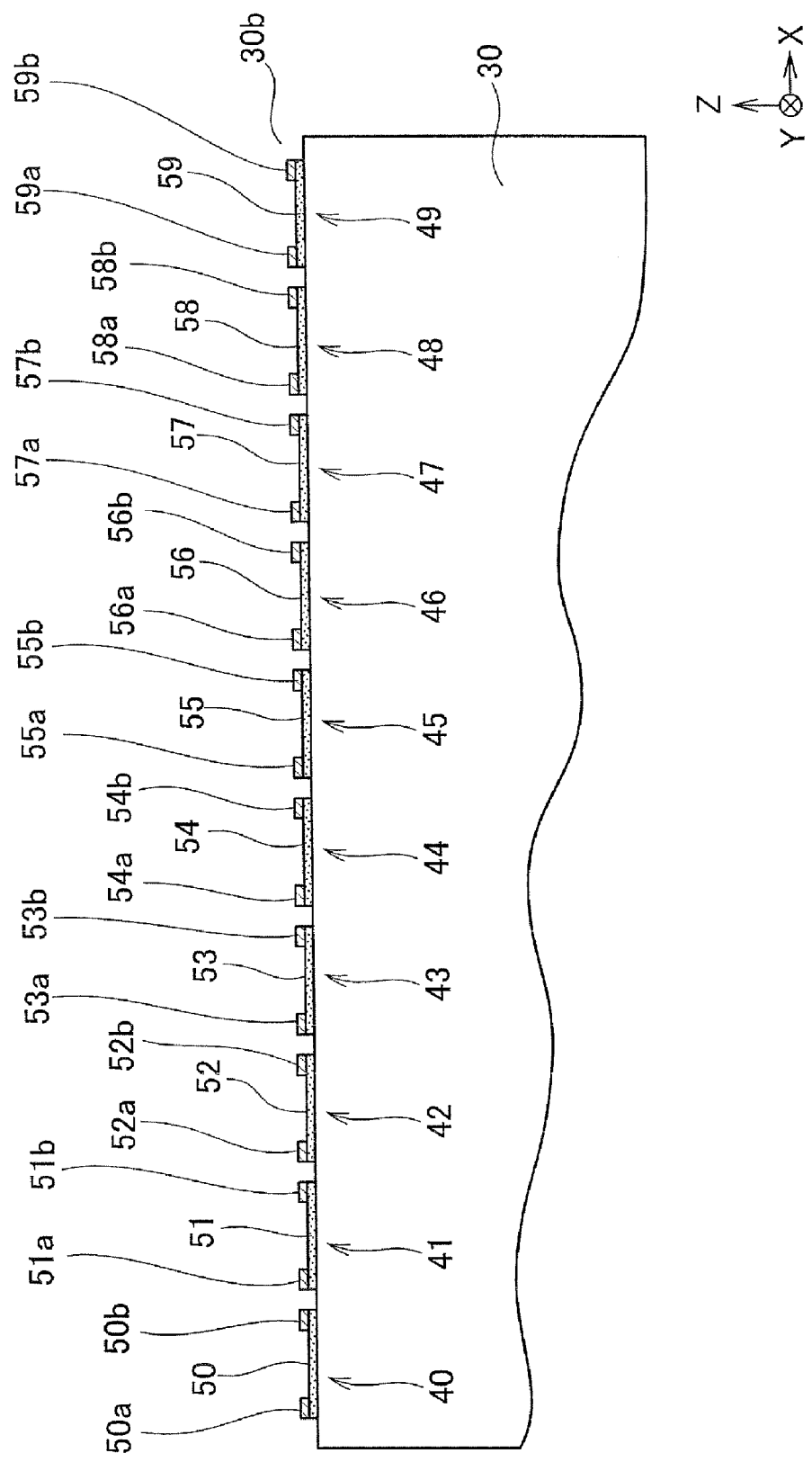
FIG. 5 is a cross-sectional view of the thin film magnetic head seen from an arrow α1-α1 shown in FIG. 4.
Figure 6:
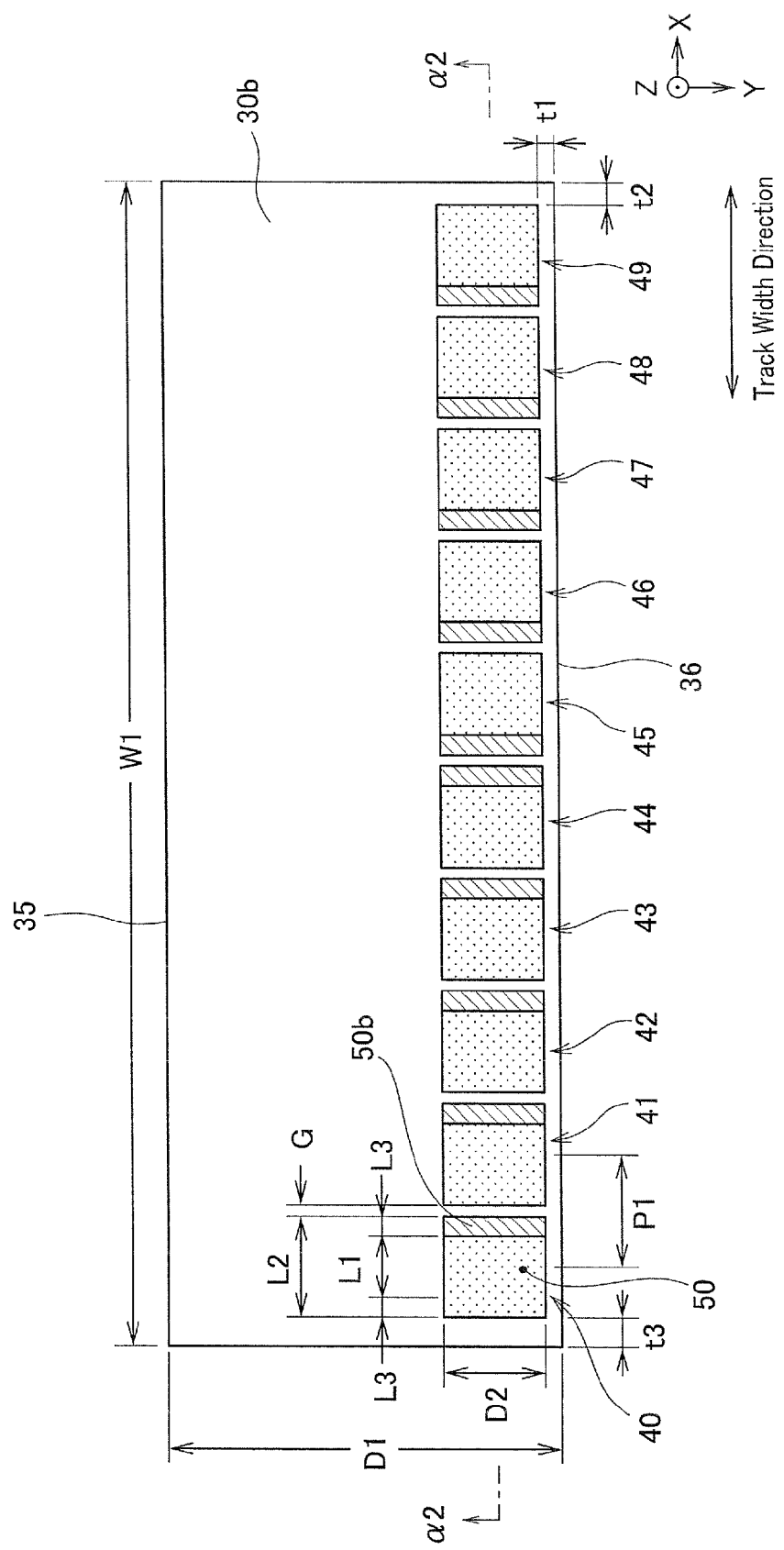
FIG. 6 is a plan view for schematically showing a formation and an array of electrode terminals according to a second embodiment and particularly in the thin film magnetic head.

FIGS. 4 and 6 are plan views for schematically showing a formation of the electrode terminals 40, 41, 42, 43, 44, 45, 46, 47, 48 and 49 formed on the head formation surface 30b. In FIGS. 4 and 6, illustration of the magnetic head element 4 is omitted. FIG. 5 is a cross-sectional view of the thin film magnetic head seen from arrow α1-α1 shown in FIG. 4, and FIG. 7 is a cross-sectional view of the thin film magnetic head seen from arrow α2-α2 shown in FIG. 6.

First Embodiment

As shown in FIGS. 4 and 5 (particularly FIG. 5), the plurality of electrode terminals 40, 41, 42, 43, 44, 45, 46, 47, 48 and 49 include, respectively, rectangular pads 50, 51, 52, 53, 54, 55, 56, 57, 58 and 59 and protrusions 50a, 50b; 51a, 51b; 52a, 52b; 53a, 53b; 54a, 54b; 55a, 55b; 56a, 56b; 57a, 57b; 58a, 58b; and 59a, 59b, which are formed along two sides of the respective rectangular pads that extend in a direction perpendicular to the track width direction.

The configuration and formation of each of the electrode terminals 40, 41, 42, 43, 44, 45, 46, 47, 48 and 49 are the same. Therefore, the electrode terminal 40 illustrated at the left-most side of the drawings is described as a representative example.

As discussed above, the electrode terminal 40 includes the rectangular pad 50 and the protrusions 50a and 50b formed respectively along the two sides of the rectangular pad that extend in a direction perpendicular to the track width direction. As an inventive concept, the electrode terminal is formed by a pad and protrusions formed along a part of the periphery of the pad.

The pad 50 is formed by a single material selected from a group of Au, Ag, Cu, Ti and Al, for example. The pad 50 is preferably formed by Au.

The protrusions 50a and 50b are preferably formed by a conductive material (metal) having a lower solder adherence property or the like than the metal selected for the pad 50. For example, Ni may be one example to form the protrusions 50a and 50b when the pad 50 is formed from Au. Even though Ni itself is a material that is generally good for soldering, it has a lower solder adherence property (higher melting point) than Au. Moreover, the protrusions 50a and 50b may be formed from alumina although alumina is not a conductive material (metal). That is, the protrusions 50a and 50b are preferably formed from a metal having the above-discussed desired property or alumina. In particular, when the protrusions 50a and 50b are formed from a conductive metal, the probe pin advantageously maintains contact with a conductive body until the probe pin is driven over (as far as the border) the protrusions 50a and 50b to allow a measurement value to be obtained. In contrast, when the protrusions 50a and 50b are formed from alumina, because alumina is the same material as that of the protective film that forms the head, there is the advantage that an additional material for the manufacturing device is unnecessary, and that the height of steps formed by the protrusions can be controlled by a polishing process.

The height of the protrusions 50a and 50b may be 20-2000 nm, and preferably 50-200 nm.

The height of the protrusions 50a and 50b is a height from the surface of the pad 50. When the height of the protrusions 50a and 50b is less than 20 nm, the step is so small that the displacement of the probe pin due to slippage caused by an overdrive effect at the time of measurement is not stopped, as the probe pin is not hooked (stopped) on the step. Therefore, there is a problem that the probe pin is driven off of the pad. On the other hand, when the height exceeds 2000 nm, there is no release for the probe pin from the slippage because the step is too large. Therefore, there is a problem that the probe pin may be bent and damaged.

A gap distance G between adjacent ones of the plurality of electrode terminals arranged in an array as shown in FIG. 4 relates to the bonding during the assembly process. It has been considered that a certain distance is ideally necessary because the possibility exists that two adjacent electrode terminals may contact when the bonding metal is applied to one of the adjacent pads and when the distance is not secured. The gap distance G is generally ideally equal to or greater than 25 μm, and in particular 30-50 μm. However, because of the protrusions in the present invention, even if the gap distance G between the adjacent ones of the plurality of electrode terminals is less than 25 μm, desired effects of the present invention are remarkably achieved. The lower limit value of the gap distance G was confirmed, through experiments, to be approximately 5 μm.

In the case of the embodiment shown in the drawings, the number of the electrode terminals is ten. However, the number may be in a range of approximately 7 to 12 depending on the size of slider.

In the design specification shown in FIG. 4, a length D1 between the first side 35 and the second side 36 of the head formation surface 30b is, for example, 230 μm. A width W of the head formation surface 30b is, for example, 700 μm. A length D2 of the electrode terminal 40 is, for example, 60 μm. A width L2 of the electrode terminal 40 is, for example, 60 μm. A width L1 taken by the pad 50 of the electrode terminal 40 is, for example, 40 μm. Widths L3 of the protrusions 50a and 50b may be 10 μm.

In FIG. 4, margins from the edges of the head formation surface 30b for arranging the electrode terminals may be such that t1 is approximately 10 μm, and that t2 and t3 are approximately 14 μm, for example.

Second Embodiment

Next, the second embodiment of the present invention is described.

A difference of the second embodiment from the first embodiment is that a single protrusion is formed on each electrode terminal.

Figure 7:
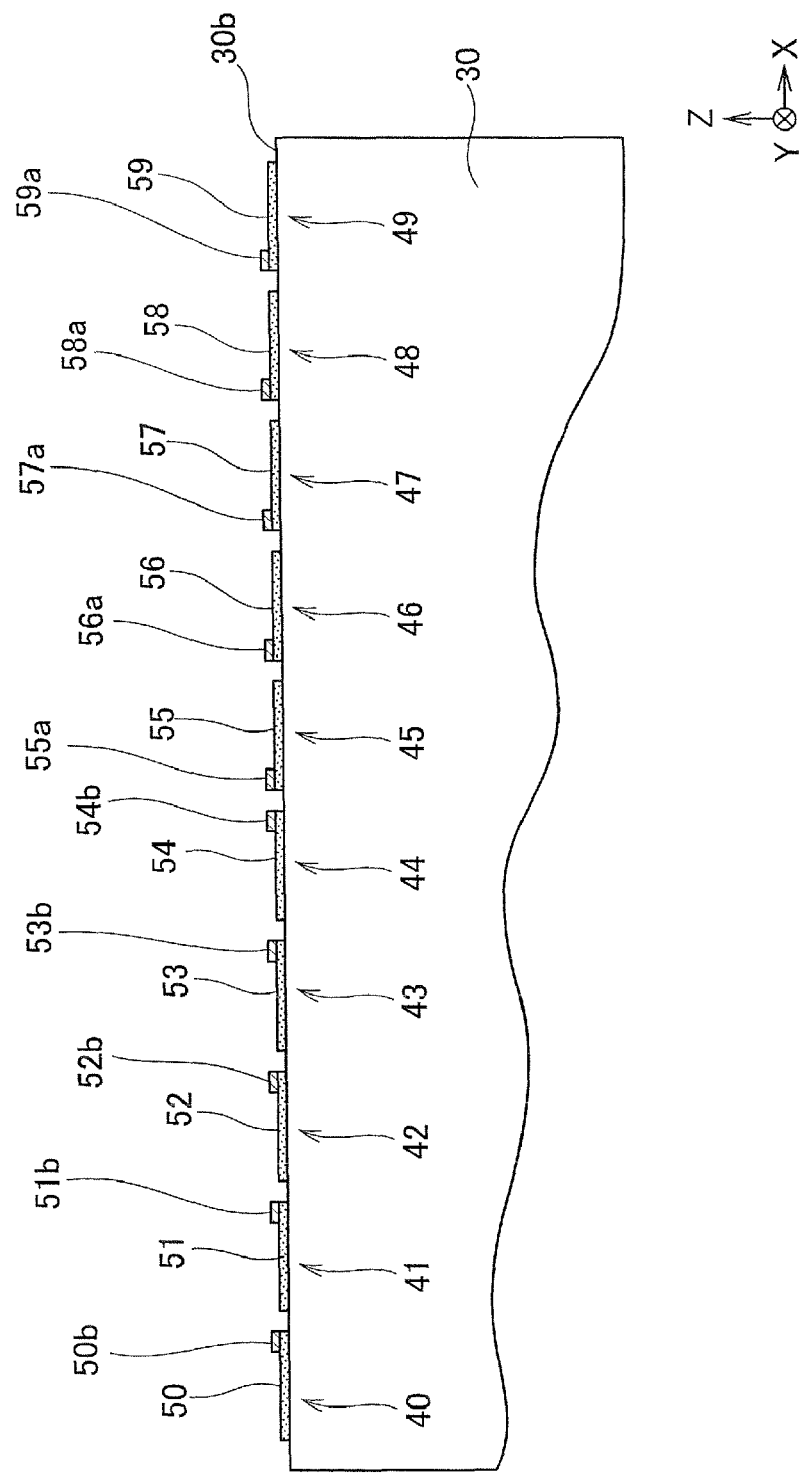
FIG. 7 is a cross-sectional view of the thin film magnetic head seen from an arrow α2-α2 shown in FIG. 6.

That is, as shown in FIGS. 6 and 7 (particularly FIG. 7), the plurality of electrode terminals 40, 41, 42, 43, 44, 45, 46, 47, 48 and 49 includes, respectively, rectangular pads 50, 51, 52, 53, 54, 55, 56, 57, 58 and 59 and protrusions 50b; 51b; 52b; 53b; 54b; 55a; 56a; 57a; 58a; and 59a, which are formed along one side of the respective rectangular pads that extend in a direction perpendicular to the track width direction.

For the pads 50, 51, 52, 53 and 54, the protrusions are formed on only the right hand side of each pad, and for the pads 55, 56, 57, 58 and 59, the protrusions are formed on only the left hand side of each pad. However, the arrangement of the protrusions is not limited to the right and left hand sides of each pad as shown in the drawings. For example, all protrusions may be formed on only the right or left hand side of each pad in the drawings. Alternatively, right hand side protrusions and left hand side protrusions may be mixed appropriately. As an inventive concept, the electrode terminal is formed by including a pad and a protrusion formed along a part of the periphery of the pad.

Similar to the case of above-discussed first embodiment, with the description of the electrode terminal 40 as a representative example, as discussed above, the electrode terminal 40 is formed from the rectangular pad 50 and the protrusion 50b, which is formed along one side of the rectangular pad that extends in a direction perpendicular to the track width direction.

The material forming the pad 50 and the material forming the protrusion 50b are the same as the case of above-discussed embodiment 1. Moreover, the configuration of height of the protrusion 50b is the same as the case of above-discussed embodiment 1.

A gap distance G between adjacent ones of the plurality of electrode terminals arranged in an array as shown in FIG. 6 relates to the bonding during the assembly process. It has been considered that a certain distance is ideally necessary because the possibility exists that two adjacent electrode terminals may contact when the bonding metal is applied to one of the adjacent pads and when the distance is not secured. The gap distance G is generally ideally equal to or greater than 25 μm, and in particular 30-50 μm. However, because of the protrusions in the present invention, even if the gap distance G between adjacent ones of the plurality of electrode terminals is less than 25 μm, desired effects of the present invention are remarkably achieved. The lower limit value of the gap distance G was confirmed, through experiments, to be approximately 5 μm.

In the case of the embodiment shown in the drawings, the number of the electrode terminals is ten. However, the number may be in a range of approximately 7 to 12 depending on the size of slider.

In the design specification shown in FIG. 6, a length D1 between the first side 35 and the second side 36 of the head formation surface 30b is, for example, 230 µm. A width W of the head formation surface 30b is, for example, 700 µm. A length D2 of the electrode terminal 40 is, for example, 60 µm. A width L2 of the electrode terminal 40 is, for example, 60 µm. A width L1 taken by the pad 50 of the electrode terminal 40 is, for example 50 µm. A width L3 of the protrusions 50a and 50b may be 10 µm.

In FIG. 6, margins from edges of the head formation surface 30b for arranging the electrode terminals may be such that t1 is approximately 10 µm and that t2 and t3 are approximately 14 µm, for example.

Third Embodiment

Although not illustrated in the drawings, the third embodiment is a case where the configuration of the electrode terminals according to the above-discussed first embodiment and the configuration of the electrode terminals according to the above-discussed second embodiment exist together. That is, the third embodiment is a case where a type of the electrode terminals that includes a rectangular pad and a protrusion formed along one side of the pad that extends in a direction perpendicular to the track width direction (second embodiment) and a type of the electrode terminals that includes a rectangular pad and protrusions formed along two sides of the pad that each extend in a direction perpendicular to the track width direction (first embodiment) exist together.

Fourth Embodiment

Figure 8:
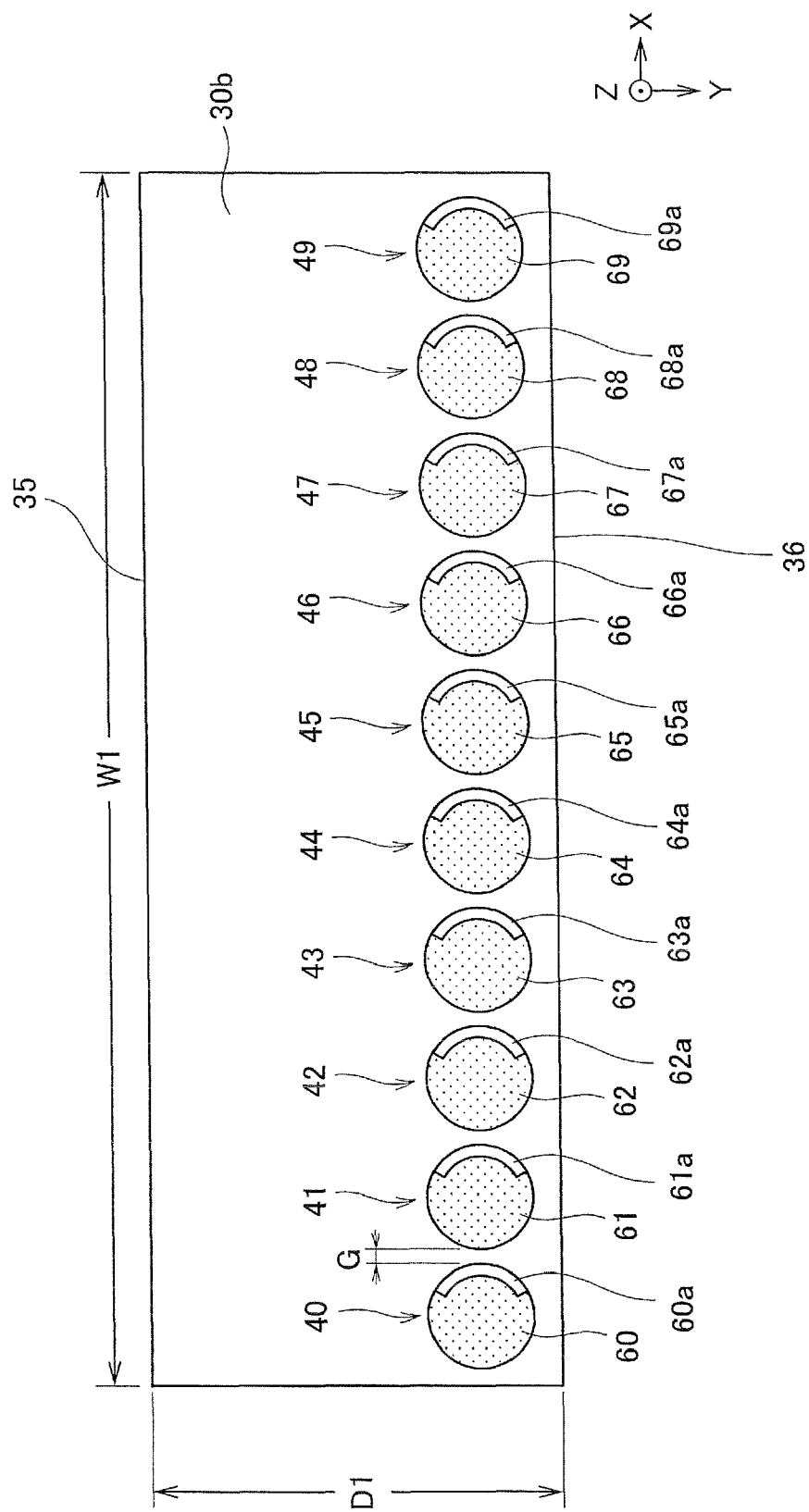
FIG. 8 is a plan view for schematically showing a formation and an array of electrode terminals according to another embodiment, particularly in the thin film magnetic head.

FIG. 8 is a plan view showing the formation of electrode terminals 40, 41, 42, 43, 44, 45, 46, 47, 48 and 49 formed on the head formation surface 30b. In FIG. 8, illustration of the magnetic head element 4 is omitted.

The difference of the fourth embodiment shown in FIG. 8 from the above-discussed first embodiment is that the shape of the pads is changed from a rectangular shape to a circular shape. In accordance with such a change, the shape of the protrusion formed along a part of the circumference of the pad necessarily becomes curved. That is, each of the plurality of electrode terminals 40, 41, 42, 43, 44, 45, 46, 47, 48 and 49 respectively includes circular pads 60, 61, 62, 63, 64, 65, 66, 67, 68 and 69, and curved protrusions 60a, 61a, 62a, 63a, 64a, 65a, 66a, 67a, 68a and 69a each formed along a part of the circumference of the respective circular pads. Location of the formation of the curved protrusions is preferable as shown in the drawing but not limited to such a configuration. In addition, the protrusion may be provided on either the right or left hand side of the pad.

The material forming the pad and the material forming the protrusion are the same as the case of the above-discussed embodiment 1. Moreover, the configuration of height of the protrusion is the same as the case of the above-discussed embodiment 1.

A gap distance G between adjacent ones of the plurality of electrode terminals arranged in an array as shown in FIG. 8 relates to the bonding during the assembly process. It has been considered that a certain distance is ideally necessary because the possibility exists that two adjacent electrode terminals may connected when the bonding metal is applied to one of the adjacent pads and when the distance is not secured. The gap distance G is generally ideally equal to or greater than 25 µm, and in particular 30-50 µm. However, because of the protrusions in the present invention, even if the gap distance G between adjacent ones of the plurality of electrode terminals is less than 25 µm, desired effects of the present invention are remarkably achieved. The lower limit value of the gap distance G was confirmed, through experiments, to be approximately 5 µm.

In the case of the embodiment shown in the drawing, the number of the electrode terminals is ten. However, the number may be in a range of approximately 7 to 12 depending on the size of slider.

Description of Additional Embodiments

In addition to the above first to fourth embodiments, the configuration of electrode terminals may be a trapezoidal configuration, a combined configuration of trapezoidal shape and rectangular shape (a configuration in which the trapezoidal shape and the rectangular shape are joined at any adjacent sides), or a combined configuration of a circular shape and a rectangular shape (a configuration in which a side(s) of the rectangular shape is curved, and the circular shape and the rectangular shape are joined). These configurations also have an object to increase a contact area for the probe pin as much as possible.

(Description of Operation of Main Parts of Invention)

The plurality of electrode terminals provided in the thin film magnetic head of the present invention is arranged in an array near and along the second side of the head formation surface that is on the opposite side from the first side on the side of the ABS 30a, from which the functional end of the magnetic head is exposed. The plurality of electrode terminals is formed from pads and protrusions formed along a part of the periphery of the pads.

With the existence of protrusions, even if the area of the electrode terminals is reduced or if the gap between the adjacent electrode terminals is reduced due to the increase in the number of electrode terminals to be provided and the like, a probe pin is prevented from sliding off and disengaging from the electrode terminals at the time of probing, and a bonding metal is prevented from flowing outside the electrode terminal at the time of bonding the electrode terminal to prevent the occurrence of a short circuit between adjacent electrode terminals.

DESCRIPTION OF DETAILED EXAMPLES

The invention of the above-discussed thin film magnetic head having the plurality of electrode terminals with a predetermined shape is described in detail with detailed examples.

Example 1

(Formation of Sample of Embodiment 1)

A thin film magnetic head that includes ten electrode terminals that have the shape shown in FIGS. 4 and 5 that are arranged in an array on the head formation surface 30b was formed.

That is, the plurality of electrode terminals 40, 41, 42, 43, 44, 45, 46, 47, 48 and 49 includes, respectively, rectangular pads 50, 51, 52, 53, 54, 55, 56, 57, 58 and 59 and protrusions 50a, 50b; 51a, 51b; 52a, 52b; 53a, 53b; 54a, 54b; 55a, 55b; 56a, 56b; 57a, 57b; 58a, 58b; and 59a, 59b, which are formed along two sides of the respective rectangular pads that extend in a direction perpendicular to the track width direction.

The specification for the dimensions is as follows:
Size of head formation surface 30b
W1=700 μm; D1=230 μm
Size of electrode terminals
L1=40 μm (pad exposure width); L2=60 μm (electrode terminal width)
L3=10 μm (protrusion width); D2=60 μm (electrode terminal length)
Protrusion height: 200 nm
Arrangement dimensions of electrode terminals
G=8 μm (gap between adjacent electrode terminals);
P1=68 μm (pitch between electrode terminals);
t1=10 μm; t2=t3=14 μm
Materials forming the electrode terminal
Pads: Au
Protrusions: NiFe (Formation of Sample of Comparative Example 1)

Figure 9:
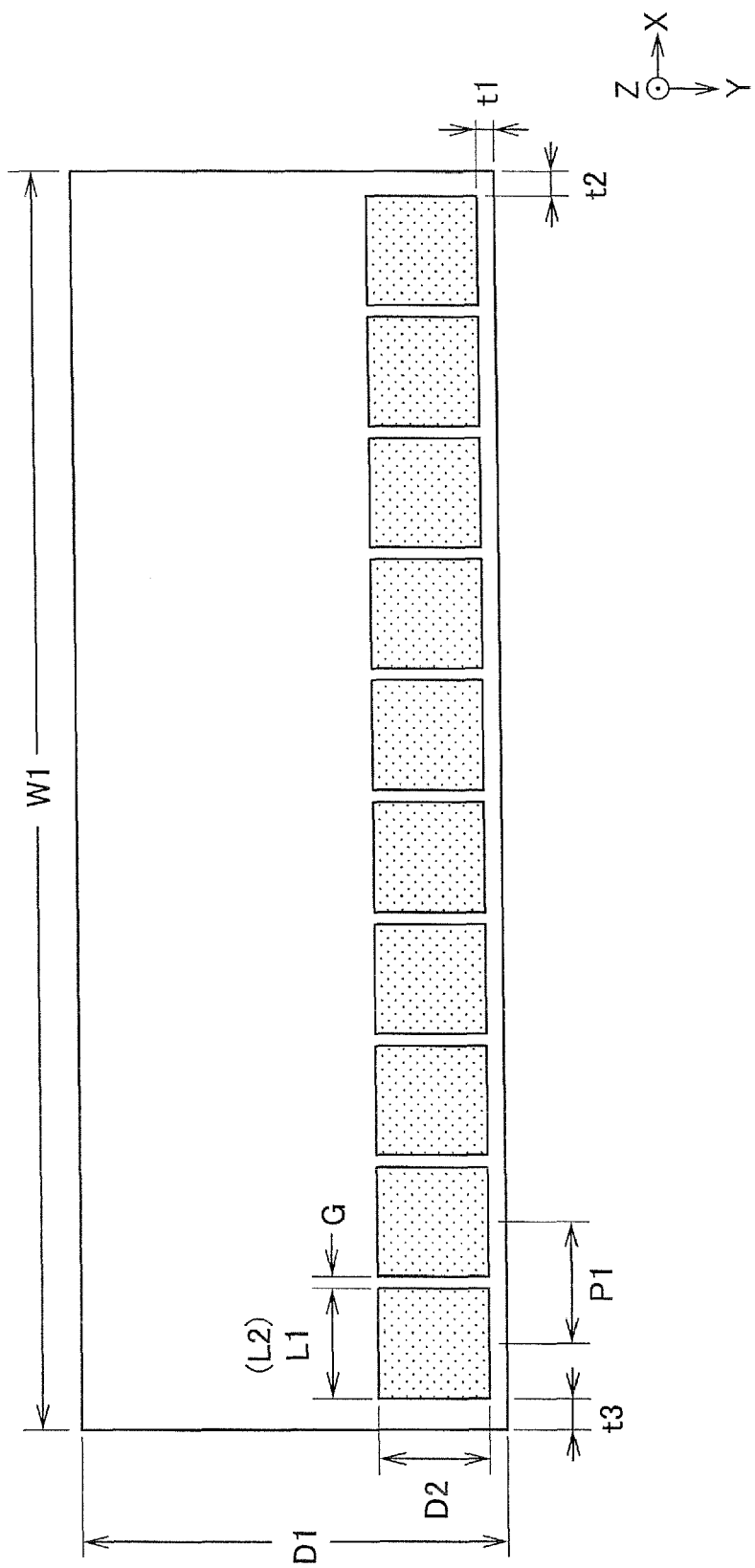
FIG. 9 is a plan view for schematically showing a formation and an array of electrode terminals according to a comparative example (conventional art), particularly in a thin film magnetic head.

To compare with the above-described sample of the first embodiment, a magnetic head shown in FIG. 9, which includes ten electrode terminals of a normal shape that are formed from only the pads without the protrusions and that are arranged in an array on the head formation surface 30b, was formed.

The specification for the dimensions is as follows:
Size of head formation surface 30b
W1=700 μm; D1=230 μm
Size of electrode terminals
L1=60 μm (pad exposure width); L2=60 μm (electrode terminal width)
D2=60 μm (electrode terminal length)
Arrangement dimensions of electrode terminals
G=8 μm (gap between adjacent electrode terminals);
P1=68 μm (pitch between electrode terminals);
t1=10 μm; t2=t3=14 μm
Material forming the electrode terminal
Pads: Au (Formation of Sample of Embodiment 2)

A thin film magnetic head that includes ten electrode terminals that have the shape shown in FIGS. 6 and 7 that are arranged in an array on the head formation surface 30b was formed.

That is, the plurality of electrode terminals 40, 41, 42, 43, 44, 45, 46, 47, 48 and 49 includes, respectively, rectangular pads 50, 51, 52, 53, 54, 55, 56, 57, 58 and 59 and protrusions 50b; 51b; 52b; 53b; 54b; 55a; 56a; 57a; 58a; and 59a, which are formed along one side of the respective rectangular pads that extends in a direction perpendicular to the track width direction.

The specification for the dimensions is as follows:
Size of head formation surface 30b
W1=700 μm; D1=230 μm
Size of electrode terminals
L1=32 μm (pad exposure width); L2=40 μm (electrode terminal width)
L3=8 μm (protrusion width); D2=40 μm (electrode terminal length)
Protrusion height: 200 nm
Arrangement dimensions of electrode terminals
G=30 μm (gap between adjacent electrode terminals);
P1=70 μm (pitch between electrode terminals);
t1=10 μm; t2=14 μm; t3=16 μm
Materials forming the electrode terminal
Pads: Au
Protrusions: NiFe (Formation of Sample of Comparative Example 2)

To compare with the above-described sample of the second embodiment, a magnetic head shown in FIG. 9, which includes ten electrode terminals of a normal shape that are formed from only the pads without the protrusions and that are arranged in an array on the head formation surface 30b, was formed.

The specification for the dimensions is as follows:
Size of head formation surface 30b
W1=700 μm; D1=230 μm
Size of electrode terminals
L1=40 μm (pad exposure width); L2=40 μm (electrode terminal width)
D2=40 μm (electrode terminal length)
Arrangement dimensions of electrode terminals
G=30 μm (gap between adjacent electrode terminals);
P1=70 μm (pitch between electrode terminals);
t1=10 μm; t2=14 μm; t3=16 μm
Material forming the electrode terminal
Pads: Au For each of the above-described samples of the first and second embodiments and samples of the first and second comparative examples, tests were conducted to determine (1) an occurrence rate of measurement errors due to the probing pin sliding off from the electrode terminal at the time of probing when element characteristic tests are performed using an electrode terminal as a measurement electrode, and (2) an occurrence rate of short circuits between adjacent electrode terminals due to a bonding metal flowing outside an electrode terminal when bonding to the electrode terminal.

Detailed descriptions of measurements for each measurement item are as follows:

(1) Occurrence Rate of Measurement Errors

For an arbitrary element in a wafer, element characteristic were measured three times using each pad. A measurement outside an acceptable range is counted as an error. The number of samples was 20,000.

A diameter of a tip of the probe pin was 25 μm.

(2) Occurrence Rate of Short Circuits by Bonding

The existence of short circuit occurrences was checked after bonding each pad on ten sliders (ten heads).

A check for short circuits at a total of 20 points was performed.

Table 1 below shows the results.

TABLE 1

| Sample | Occurrence rate of Measurement Errors (%) | Occurrence rate of Short Circuits by Bonding (%) |
| --- | --- | --- |
| Embodiment 1 | 0.004 | 0.001 |
| Comparative 1 | 0.004 | 95.000 |
| Embodiment 2 | 0.004 | 0.001 |
| Comparative 2 | 0.100 | 0.001 |

<Comparison Between Sample of Embodiment 1 and Sample of Comparative Example 1>

With comparative sample 1, because the pad exposure width was 60 μm, which is large, the occurrence rate of measurement errors was suppressed. However, because the gap G between adjacent electrode terminals was 8 μm, which is narrow, the occurrence rate of short circuits was extremely high. In contrast, with the sample of the first embodiment, although the pad exposure width was 40 μm, which is narrower, because protrusions with a 10 μm width were provided on both sides of each pad, the occurrence rate of measure errors was extremely low. In addition, even with the narrow gap G of 8 μm between adjacent electrode terminals, the occurrence rate of short circuits was remarkably low. Moreover, as the value for the gap G was reduced, it was confirmed by the experiments that the lower limit value for the gap G is approximately 5 μm.

<Comparison Between Sample of Embodiment 2 and Sample of Comparative Example 2>

With comparative sample 2, because the gap G between adjacent electrode terminals was 30 μm, which is relatively wide, the occurrence rate of short circuits was suppressed. However, because the pad exposure width was 40 μm, which is narrow, the occurrence rate of measurement errors was high. In contrast, with the sample of the second embodiment, although the pad exposure width was 38 μm, which is narrow, because a protrusion with an 8 μm width was provided on one side of each pad, the occurrence rate of measurement errors was extremely low. In addition, because the gap G between adjacent electrode terminals was 30 μm, the occurrence of short circuits was not an issue at all.

It has been confirmed that, with conventional electrode terminals that do not have protrusions, when the gap G between adjacent terminals is equal to or less than 28 μm, the occurrence rate of short circuits would become remarkably high. Further, it has been confirmed that, with conventional electrode terminals that do not have the protrusions, when the pad exposure width is equal to or less than 40 μm, the occurrence rate of measurement errors would become remarkably high.

Based on the above results, effects of the present invention are apparent.

That is, the thin film magnetic head of the present invention has a plurality of electrode terminals formed on the substantially same surface as the head formation surface on which magnetic head elements are laminated. The plurality of electrode terminals is arranged in an array near and along the second side of the head formation surface that is opposite the first side on the side of the ABS, from which the functional end of the magnetic head is exposed. The plurality of electrode terminals is formed to include pads and a protrusion(s) formed along a part of the periphery of the pad. Therefore, even if the area of the electrode terminals becomes small or even if the gap between adjacent electrode terminals becomes small due to the increase in the number of electrode terminals to be provided and the like, the measurement errors can be reduced by preventing the measurement pin (probe pin) from sliding off and becoming disengaged from the electrode terminals at the time of probing, and a bonding metal can be prevented from flowing outside the electrode terminal at the time of bonding the electrode terminal to cause the occurrence of a short circuit between adjacent electrode terminals.

What is claimed is:

1. A thin film magnetic head, comprising:
    a slider substrate having an air bearing surface (ABS) that configured to provide an appropriate flying height from a recording medium;
    a magnetic head element formed on a head formation surface that is a side surface relative to the ABS when the ABS is considered as a bottom surface, that is in an approximately rectangular shape that is perpendicular to a track direction; and
    a plurality of electrode terminals formed on a substantially same surface as the head formation surface on which the magnetic head element is laminated, wherein
    the plurality of electrode terminals is arranged in an array on a second side of the head formation surface that is opposite a first side on the ABS side from which a functional end of the magnetic head is exposed,
    the plurality of electrode terminals includes a pad and a protrusion formed along a part of a periphery of the pad,
    the pad and the protrusion are configured from different materials, and
    the pad is formed from one of Au, Ag, Cu, Ti and Al, and the protrusion is formed from one of a conductive material and alumina, the conductive material having a lower solder adherence property than the material selected for the pad.

2. The thin film magnetic head according to claim 1, wherein the plurality of electrode terminals includes a rectangular pad and a protrusion formed along at least one side of the rectangular pad.

3. The thin film magnetic head according to claim 2, wherein each of the plurality of electrode terminals includes a rectangular pad and a protrusion formed along only one side of the rectangular pad that extends in a direction perpendicular to a track width direction.

4. The thin film magnetic head according to claim 2, wherein each of the plurality of electrode terminals includes a rectangular pad and protrusions formed along two sides of the rectangular pad that extend in a direction perpendicular to a track width direction.

5. The thin film magnetic head according to claim 2, wherein each of the plurality of electrode terminals is either of a type of electrode terminal including a rectangular pad and a protrusion formed along one side of the rectangular pad that extends in a direction perpendicular to a track width direction or of another type of electrode terminal including a rectangular pad and protrusions formed along two sides of the rectangular pad that extend in the direction perpendicular to the track width direction.

6. The thin film magnetic head according to claim 1, wherein the protrusion is formed on the pad.

7. The thin film magnetic head according to claim 1, wherein a height of the protrusion is 50-200 nm.

8. The thin film magnetic head according to claim 2, wherein a gap distance between adjacent ones of the plurality of electrode terminals arranged in the array is 5 μm or greater and 25 μm or less.

9. The thin film magnetic head according to claim 2, wherein the number of the plurality of electrode terminals arranged in the array is in a range of 7-12.

10. A head gimbal assembly, comprising:
    a slider including the thin film magnetic head of claim 1 and positioned so as to oppose a recording medium; and
    a suspension that flexibly supports the slider.

11. A magnetic disk device, comprising:
    a slider including the thin film magnetic head of claim 1 and positioned so as to oppose a recording medium; and
    a positioning device that supports and positions the slider with respect to the recording medium.

12. The thin film magnetic head according to claim 1, wherein
    the plurality of electrode terminals includes a circular pad and a protrusion formed along at least a part of a circumference of the circular pad.

13. An electronic component, comprising:
    a substrate; and
    a plurality of electrode terminals formed in an array on a surface of the substrate, wherein
    at least one of the electrode terminals includes a pad and a protrusion formed along a part of a periphery of the pad,
    the pad and the protrusion are configured from different materials, and the pad is formed from one of Au, Ag, Cu, Ti and Al, and the protrusion is formed from one of a conductive material and alumina, the conductive material having a lower solder adherence property than the material selected for the pad.

14. The electronic component according to claim 13, wherein the pad has an area on which a measurement pin for testing is slidably attached, and the protrusion has a predetermined height such that the measurement pin is hooked by the protrusion and is thereafter drivable over the protrusion without being damaged.

15. The electronic component according to claim 14, wherein substantially all of the electrode terminals include the pad and the protrusion.

\* \* \* \* \*